United States Patent [19]
Becher et al.

[11] Patent Number: 5,447,017
[45] Date of Patent: Sep. 5, 1995

[54] AUTOMATIC WASTE RECYCLING MACHINE AND DISPOSAL SYSTEM

[76] Inventors: Yona Becher, 45 Woodmont Dr., Randolph, N.J. 07869; Daniel M. Lemieux, Old County Rd., Bridgton, Me. 04009

[21] Appl. No.: 279,220

[22] Filed: Jul. 22, 1994

Related U.S. Application Data

[63] Continuation-in-part of Ser. No. 966,735, Oct. 26, 1992, abandoned.

[51] Int. Cl.⁶ .................. B65B 1/24; B65B 55/24; B65B 57/00; B30B 15/00
[52] U.S. Cl. ..................... 53/527; 53/121; 53/168; 53/431; 53/508; 53/237; 53/513
[58] Field of Search ............ 53/527, 523, 436, 435, 53/431, 121, 111 R, 431, 513, 508, 507, 168, 237, 235, 284.7, 570; 100/221, 223, 218, 215, 99

[56] References Cited

U.S. PATENT DOCUMENTS

| | | | |
|---|---|---|---|
| 4,241,652 | 12/1980 | Smedlund | 53/527 X |
| 4,275,651 | 6/1981 | Groth et al. | 53/527 X |
| 4,620,479 | 11/1986 | Diamond et al. | 53/527 X |
| 5,155,975 | 10/1992 | Knowler | 53/527 X |
| 5,259,304 | 11/1993 | Roberts | 53/527 X |

*Primary Examiner*—James F. Coan

[57] ABSTRACT

This present invention relates to an automatic recycling machine and automatic waste disposal system for plural types of household and commercial waste materials which automatically sorts, processes, shreds, crushes, compacts, rinses by cleaning liquid for removal of contamination and dirt from certain washable waste types, packages the waste material, and identifying the package with waste type and waste source by barcode marking.

The automatic recycling machine is constructed as an appliance and includes separate fluid power actuation means for each type of recyclable material and non-recyclable waste, and control system to control the recycling process for each waste material type separately. The automatic recycling machine also comprises an operator control panel which includes warning indicators to inform on filled waste package of certain waste material type.

According to the present invention, after the waste package is filled with sorted and processed waste material, it is automatically sealed, and then automatically removed from the automatic recycling machine.

Furthermore, according to the present invention, the waste package is then automatically conveyed out of the household or commercial building by conveyor for waste material packages, located below floor level. The package is delivered to a external storage bin for multiple waste packages, located in the curbside or near driveway of the building, where it is automatically loaded into a storage container.

Indication means are attached to the storage bin to provide information on the types of waste material packages which are stored in the storage bin, thereby preparing for central waste collection of sorted and bar-code marked recyclable and non-recyclable waste.

13 Claims, 10 Drawing Sheets

AUTOMATIC WASTE RECYCLING MACHINE AND DISPOSAL SYSTEM

This application is a Continuation-in Part of Ser. No. 07/966,735 filed on Oct. 26, 1992, and now abandoned.

BACKGROUND OF THE INVENTION (A) Field of the Invention

As known, waste, refuse, trash and garbage adds up to one of the most critical problems of our time. No corner of the earth is immune from the huge mass of waste that is polluting the land, air, water, and environment. Waste is piled high in cities, in rural dumps, on beaches, and in harbors. Landfills are overloaded, leaking hazardous chemicals into ground and water.

Updated research data shows that at least 230 million tons of solid waste are generated every year in U.S.A. in our homes and businesses, or more than 5 pounds for each man, woman and child every single day. Each household throws out an average of 13000 pieces of paper, 1800 plastic items, 500 aluminum cans and 500 glass bottles a year. The cost of waste disposal have risen to $50 and more per ton, or $8 billion for household and office garbage alone.

Landfilling is the current way of disposal of 80% of the trash in U.S.A. However, landfilling present serious health and ecological problems.

Trying to reduce the volume of the trash, solutions have been tried such as burning the trash in Incinerators. However, this has caused severe health problems and cost billions of dollars to build, operate and maintain.

Recycling and reusing the waste materials is today the most effective, economical and healthy way of solving the waste disposal problem. Based on recent research data, 42% of the solid waste is paper- corrugated cardboard, newspaper, magazines, books, paper-board and office paper. Glass containers are 9%, aluminum cans 8% and plastic 7%. which means that altogether 66% of the trash can be recycled. Annually this amounts to about 150 million ton in U.S.A.

(B) Description of Prior Art

Prior art includes ways to improve and organize the waste collection and recycling duties and proposes several types of storage containers for helping with the sorting of the household waste materials. Other patents include means to mechanically reduce the volume of some waste containers such as aluminum cans with mechanical means of crushing plastic containers of certain shapes.

Few examples of the patent which are related to this prior art are: U.S. Pat. Nos. 5,072,833 to D. Hansen and P. F. Mahoney, 5,042,634 to C. Gulmini and 5,048,903 to E. Loblein.

Other Drior art patents relate to compacting means for waste material:

U.S. Pat. No. 4,241,562 by Kurt H Smedlund disclosed means to compact plural refuse receivers on an indexable support, by a power-operated mechanism. However, its mechanism for compacting multiple refuse receivers in controlled manually, with multiple cyclic compacting, which is not suitable for multiple types of waste, where usually only one receiver needs compacting at a time.

U.S. Patent No. 4,620,479 by Fredrick L. Diamond provides special collapsible box in which the waste material is compacted by hydraulic ram. However, the control of compacting operation and the removal of the filled bag are done manually.

U.S. Pat. No. 4,638,730 by Robert W. Bonacorsi disclosed means to remove the filled bag by a wheeled bin which is removed from the compactor housing and moved to the site of waste disposal. However, the control of compacting operation and the removal of the filled bag is done manually.

U.S. Pat. No. 4,275,651 by Hugh F. Groth and Gullbert M. Hunt disclosed compacting means which include a ram driven by scissor-type actuator. The container is made of rigid plastic which is attached to two wheel cart for moving the container. However, the control of the compacting operations and the removal of the filed bag is done manually.

U.S. Pat. No. 5,155,975 by James T. Knower disclosed a driven rotor which mesh with static teeth of anvil member which is used to shred waste material and also to compact it into the waste box. However, the shredding operations and the removal of waste box with fork lift-type jack, may not be suitable for household use. In addition, the waste material is not sealed inside a housing and also the control of the shredding operations and the removal of waste is done manually.

U.S. Pat. No. 5,259,304 by Mark A. Roberts disclosed a Carousel Compactor for Multi Component Refuse. The specific waste containers are being turned to certain angular location for receiving new waste, compacting and removal of the filled bags. However, the control of all operations, including introducing new waste, compacting and removal of filled bag is done manually by means of microprocessor keyboard."

However, the prior art has not provided a extensive solution to the household and commercial waste recycling and collection which could be widely utilized by the public.

According to said prior art, the recycling the waste material handling still requires tedious and mostly manual effort every single day.

Even by utilizing the prior art techniques for recycling and reducing the volume of the waste, there is still no efficient way to help the public in the daily coping with the new recent waste recycling laws which were enforced in many states throughout the country.

Furthermore, the prior art has not solved the waste material recycling and disposal problem, relating to the recent requirements for waste material recycling in every household and business, and for reducing the volume of non-recyclable waste.

OBJECTS AND ADVANTAGES OF THE INVENTION

The object of this invention is to provide an automatic recycling machine for household or business, consisting of modular multi-recycling units, each recycling unit processing single type of waste material, and all recycling units are connected together to a central fluid power source and central control box which controls the operation of the units as one recycling machine.

Once the waste material is inserted through the waste insertion opening of the appropriate unit, which is intended to recycle this type of waste, each unit is capable performing automatically and independently of other units a sequence of operations:

1. The recycling machine makes sure that all covers and partitions are closed and therefore safe before starting any operation, by means of special sensing devices. The recycling unit is then completely sealed, to prevent bad odors.

2. Official paper may be sheared (as an option) by passing through a shearing mechanism, so that documents are destroyed before being compacted.

3. The recycling unit utilizes pneumatic power to compact the new inserted waste material by applying pressure on a rolling type diaphragm which is connected to a moving ram. The ram compacts the waste material inside a special bag which is carried inside a waste retainer. The ram has special contact means for different waste materials. Therefore, it crushes glass to small pieces, it perferates material etc.

4. The travel of the ram is sensed by an actuator position sensor. When the waste bag is filled, the actuator position sensor provides signal to the control box.

5. The waste material which needs to be cleaned such as plastic and glass, is sprayed with cleaning liquid and rinsed with water.

6. The pneumatically operated mechanism for sealing the waste bag is operated. The waste bag is sealed by pressing the bag top portion and forcing pressure sensitive adhesive surfaces together. The bag also include marking means such as Bar code which include information on the waste type and details of the household or business source.

7. The bottom opening of the waste container will be opened by pneumatic actuator to allow the bag to move out. The sealed bag is then pushed down by the ram through the waste container and out through the bottom covers of the recycling unit.

8. After bag is disposed out of the recycling machine, it slides down through an opening in the floor to a conveyor belt. The conveyor moves the bag to an external storage bin through a sealed partition.

9. The bag is stored inside the external waste storage bin which is located near the driveway of the building or near the curbside. The waste storage bin is sealed, and includes an external indication means such as lights which indicate the waste types which are currently stored in the bin. The waste packages are prepared to be collected by a central collection means for sorted waste materials.

More particular object of the invention is to provide a novelty means of automatic recycling machine for the household and commercial waste in convenient, trouble-free, odorless, safe, efficient and even profitable way. The recycling has become important part of our daily life after that very strict laws in many states requires the recycling of most of the waste material. Recycling by the law, requires a daily or even hourly unpleasant and somewhat messy effort from every citizen. The object of this invention is to make recycling an easy, fast and comfortable routine of our everyday life.

Furthermore, The object of this invention is to provide each household and commercial with an affordable new appliance which is neat looking, clean and odorless such as a washer or dryer appliances, which will replace the kitchen garbage container and the countless bags and plastic containers used for recyclable waste, by one automatic recycling machine for all types of recyclable waste materials and the non-recyclable waste.

In addition, the automatic recycling machine improves the quality and thereby the value of the recyclable materials, first, by the efficient sorting, second, by crushing and compacting so as to reduce the volume to a minimum, thereby reducing conveying expenses per pound waste, and third, by rinsing and cleaning the compacted waste so as to remove dirt and contamination, thereby improving the quality of the waste material.

Therefore, It is an objective of the invention to give a credit to the household or commercial source for his valuable waste material. The credit is given according to the waste type and is addressed to the identified waste source as marked on the waste package, thereby giving incentive to recycle more waste material and improve its quality for higher return value. The recycling industry will benefit too from a higher quality and cleaner raw materials by saving on sorting and cleaning expenses. Basically, it is much easier to sort and clean the waste material while it is still in the household where it is still fresh than to sort and clean it after weeks when it smells and is very messy.

A further advantage of this patent is the increase in amount of recycled waste material as well as its percentage from the total waste, due to the easy and clean way of waste disposal, so as to reduce the amount of non-recycled waste, thereby reducing to a minimum the waste disposal problem, which exists in a extent of township, county, state and country.

Furthermore, the automatic conveying of the sealed waste packages from the automatic recycling machine to a storage bin outside the household or commercial building, reduces the unpleasant effort of removing the waste from the house on a daily basis, and especially when there are at least five types of recyclable material, which multiply this disposal effort.

According to this invention, the packaged and sealed waste material will be stored in an external sealed bin, thereby eliminating the unpleasant view of the waste filled containers which are left in the streets with the waste material being occasionally spread or spilling all around by wild animals, before being collected. Therefore, the sealed storage bins for packaged waste material will keep our yards, driveways, and streets cleaner, and healthier.

In addition, according to this invention, the package is specially prepared to be collected in a special automatic central collection machine, which will read the bar-code marking on the package and will sort the waste according to its type, and also will provide credit to the household or commercial source of the waste as identified by the bar-code.

In general, it is the primary objective of this invention to solve the waste problem of this country and beyond, by providing affordable automatic recycling and disposal system for at least the following waste material types:

1. Recyclable materials:
    Paper types: Newspaper, Magazine paper and cardboard.
    Glass types: Clear Glass, Green Glass and Blue Glass.
    Aluminum: Aluminum Cans.
    Metal Cans: Bi-metal Cans.
    Plastics: Plastic types 1,2,3 including Bags, Plastic Bottles of beverage, Plastic jags for milk, spring water, laundry, cosmetic containers, etc.
2. Non recyclable materials.

BRIEF DESCRIPTION OF THE DRAWINGS

The invention as herein described, by a way of example only, with reference to the accompanying drawings, wherein.

DESCRIPTION OF THE PREFERRED EMBODIMENT

The automatic recycling machine and disposal system consists of modular multi-recycling units each recycling unit processing a single type of waste material, and all recycling units are connected together to a central fluid power source and central control box which controls the operation of the units as one recycling machine. The disposal system further consists of a conveyor and a storage bin.

Figure 1:
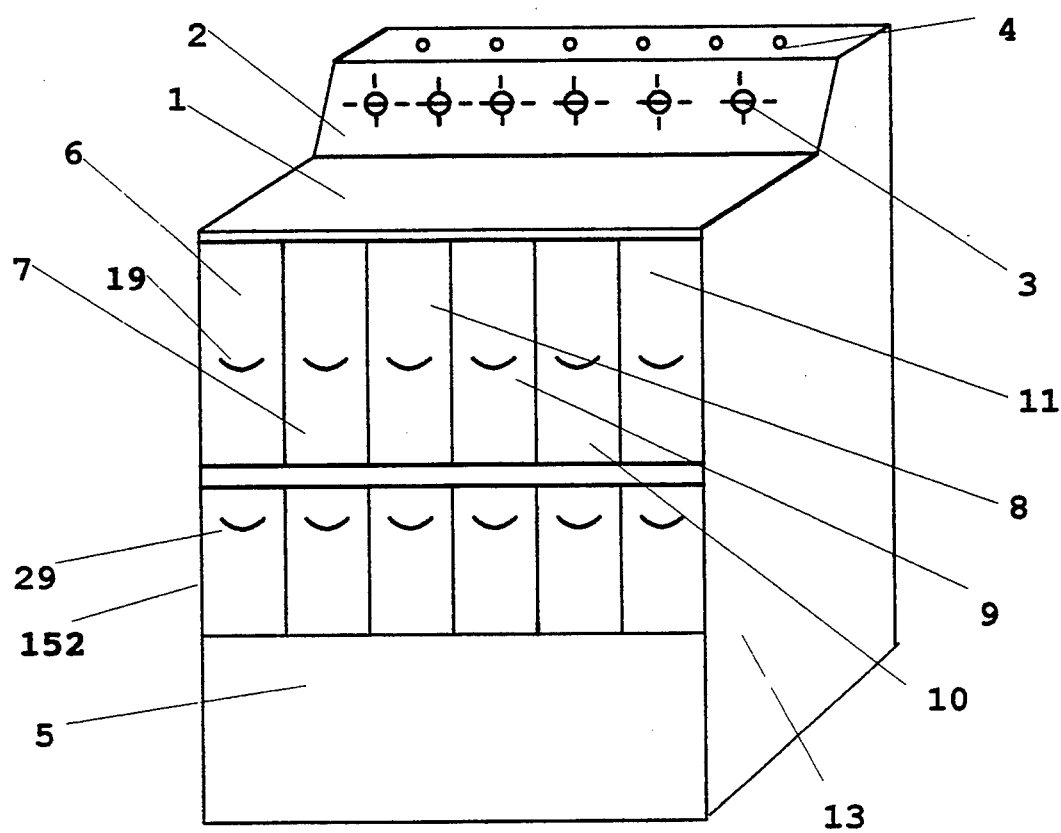
FIG. 1 is a three dimensional view of the automatic waste recycling machine assembly.

Referring to FIG. 1, a preferred embodiment of the automatic recycling machine is shown in three dimensional view. The recycling machine assembly 1 resembles an appliance such as household washer or dryer in shape, size, appearance and the control panel. It has a cubicle shape with a top control panel 2 which includes the control knobs 3 to control the electrical power to each one of the recycling machine units, and the optional operating modes:

a. The option of automatic disposal of waste package, which operates the automatic disposal system, conveying system and external storage bin for the waste packages.

b. The option of rinsing washable waste with cleaning liquid.

c. The option of shredding paper and cardboard paper.

The operator control panel also includes a warning indicator light 4, one for each recycling unit, which is turned on whenever the waste package is being filled, which means that a new empty package shall be installed.

The front panel 5 displays the multiple of modular recycling machine units, each related to the recycling of different type of waste material. The recycling units shown in this embodiment are for example only and other waste material types may be chosen. The recycling units shown include newspaper unit 6, paper cardboard unit 7, aluminum cans unit 8, plastic unit 9, glass unit 10, and non-recyclable waste unit.

Figure 4:
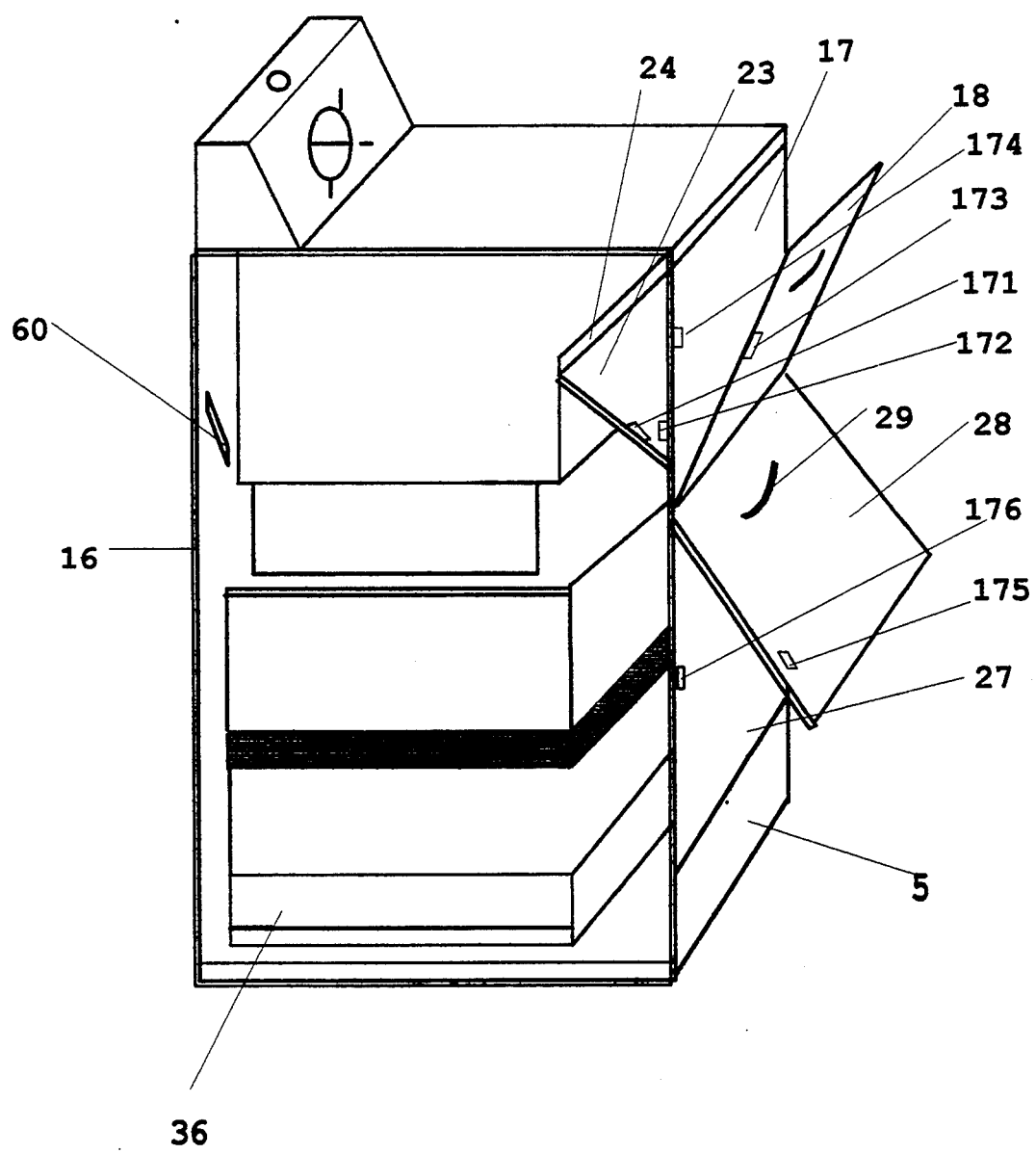
FIG. 4 is a side view of a typical recycling machine unit, with the left side panel being removed.

Referring to FIG. 4, a side view of a typical waste recycling machine unit, with left panel removed, is shown.

The side view illustrates the internal construction of a typical recycling machine unit comprises a sealed compartment 16, with front opening 17 through which the particular waste material is introduced to the recycling machine unit, a cover 18 which is hinged horizontally to compartment 16, an handle 19 for easy opening and closing of the cover, a circumference seal around the cover 18 for hermetic sealing of the opening, a latching means for the locking of the cover to the front panel 5.

Guiding means for the waste material from the opening 17 to the collection bag 20 including a partition 23, which swings on horizontal hinge 24 which is attached to the compartment 16, through which the waste material is introduced, A torsional spring is mounted around the hinge 24 so as to force the partition back to its normal closed and sealed position, after the waste material was guided to the collection bag 20. A circumference seal is provided for the hermetic sealing of partition 23 to the compartment 16. The partition must be fully closed for the recycling process to take place.

An opening 27 in the lower front panel of compartment 16 is provided for the loading of an empty waste collection bag 20 and A cover 28 comprises a handle 29 for easy opening and closing cover 28. A circumference sealing means is provided for hermetic sealing of the opening 27 to the compartment 16. A latching means are provided for the locking of the cover to the front panel 5.

Figure 6:
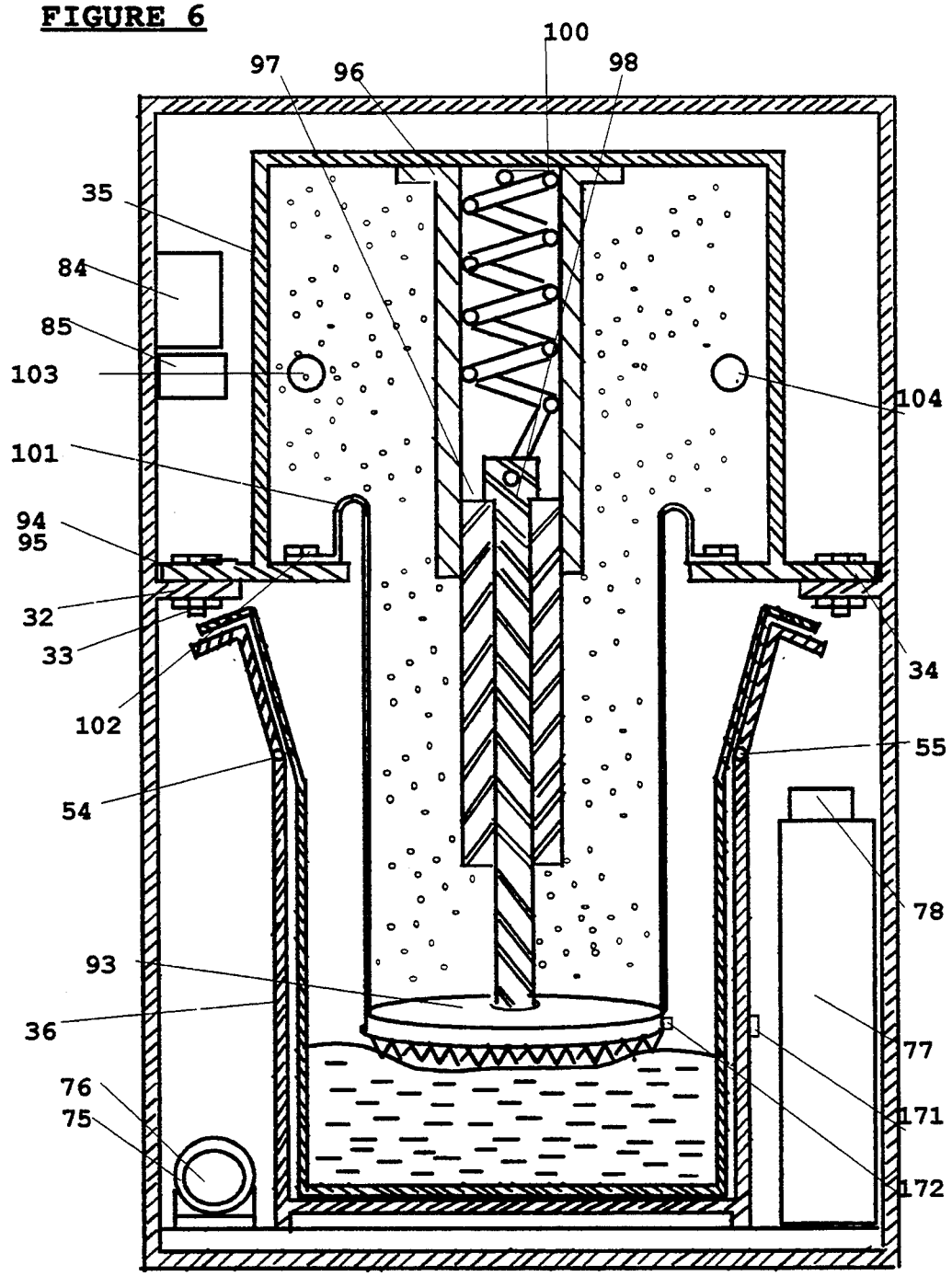
FIG. 6 is a sectional view through a typical recycling unit with the actuator in operating (pressurized) position of the preferred embodiment.
Figure 7:
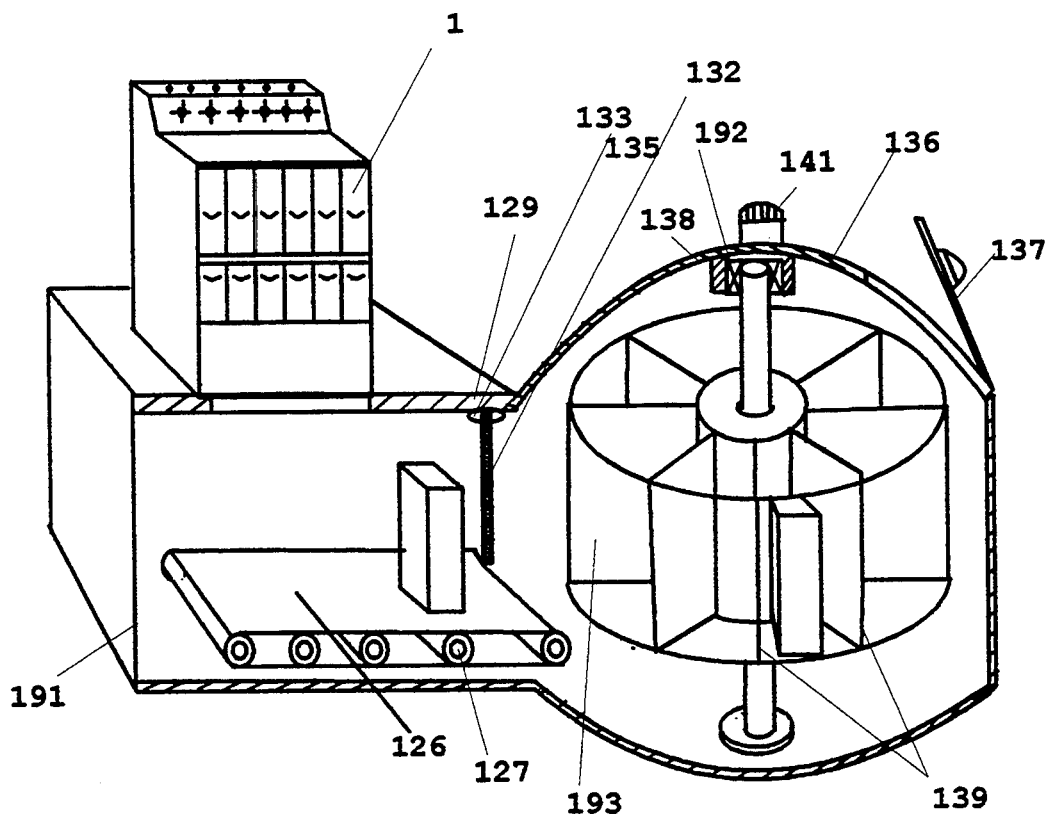
FIG. 7 shows the automatic recycling and waste disposal machine including the external storage bin and the conveying system for the waste packages.

A horizontal flange 32 which is radially projected into compartment 16, is hermetically welded to the compartment 16 vertical walls, wherein fasteners 33 and seal 34 are used to hermetically connect a pressure vessel container 35 to flange 32.(shown in FIG. 6)

A opening 68 through the bottom panel of compartment 16. Two panel doors 69 and 70, are mounted on hinges 71 and 72 which equipped with torsion springs, so as to allow the panel doors to open downwards. The torsion springs apply torque on panel doors 69 and 70 so as to keep them in closed position. After the waste bag is filled, sealed and the waste container bottom doors are opened as will described later, and the bag is pushed down and push the bottom panel doors 69 and 70, so that the bag is disposed from the automatic recycling machine.

Figure 5:
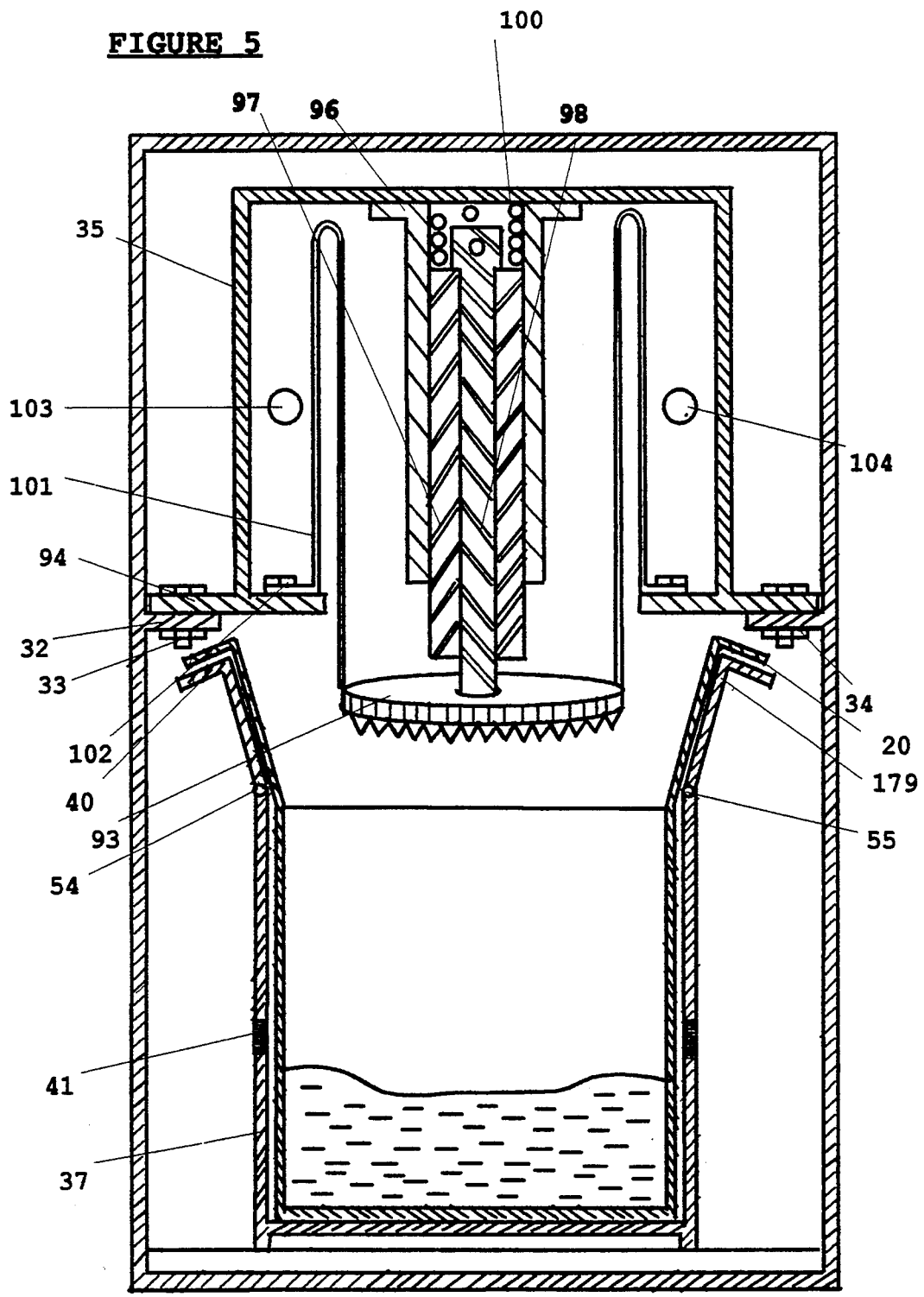
FIG. 5 is a sectional view through a typical recycling unit with the actuator in a non operating (not pressurized) position of the preferred embodiment.

Shown in FIGS. 5 is a waste container assembly of automatic waste recycling machine unit with waste packaging locking and disposal means.

Figure 9:
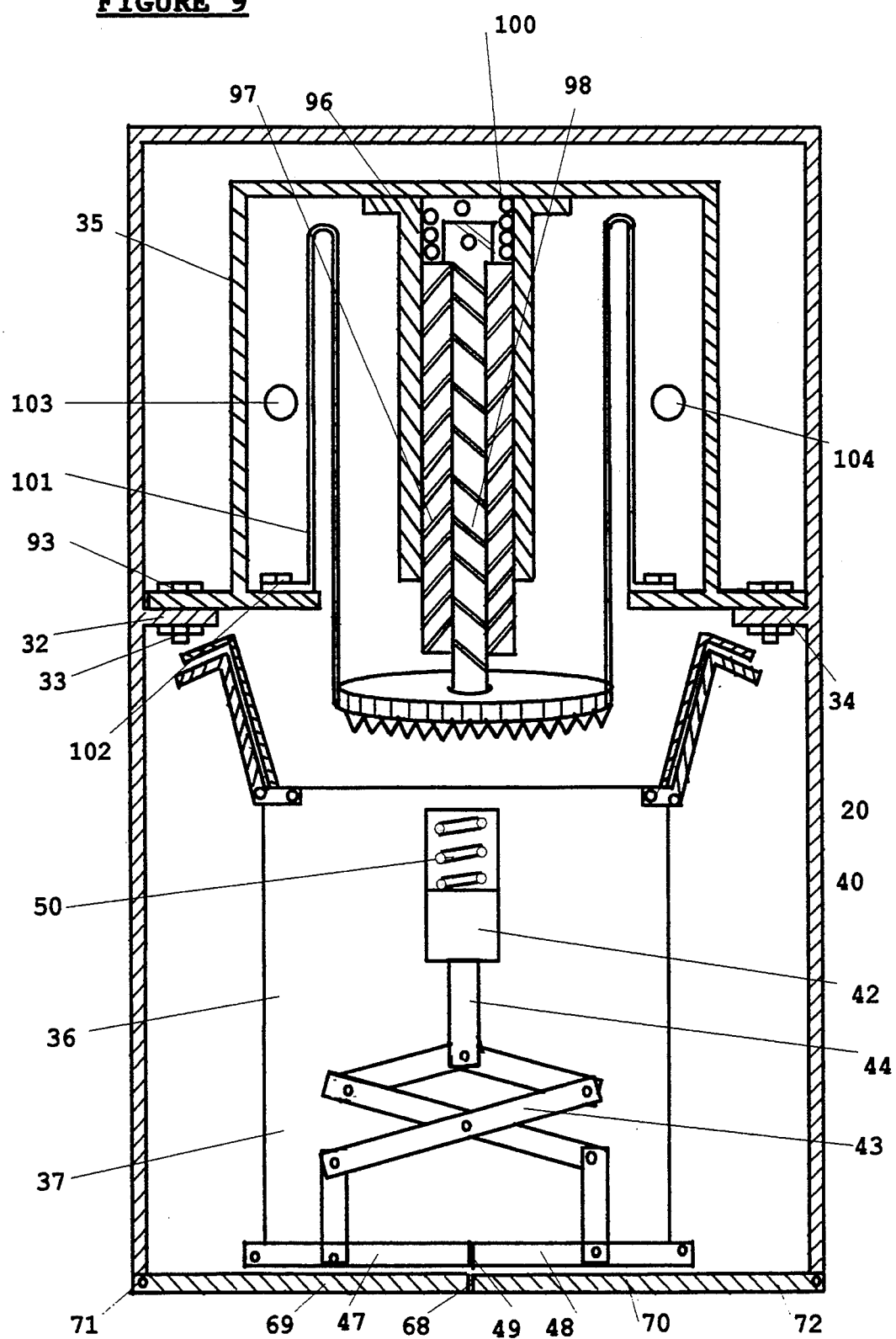
FIG. 9 is a sectional view through a typical recycling unit with the waste retainer bottom opening actuator and preferred embodiment.
Figure 10:
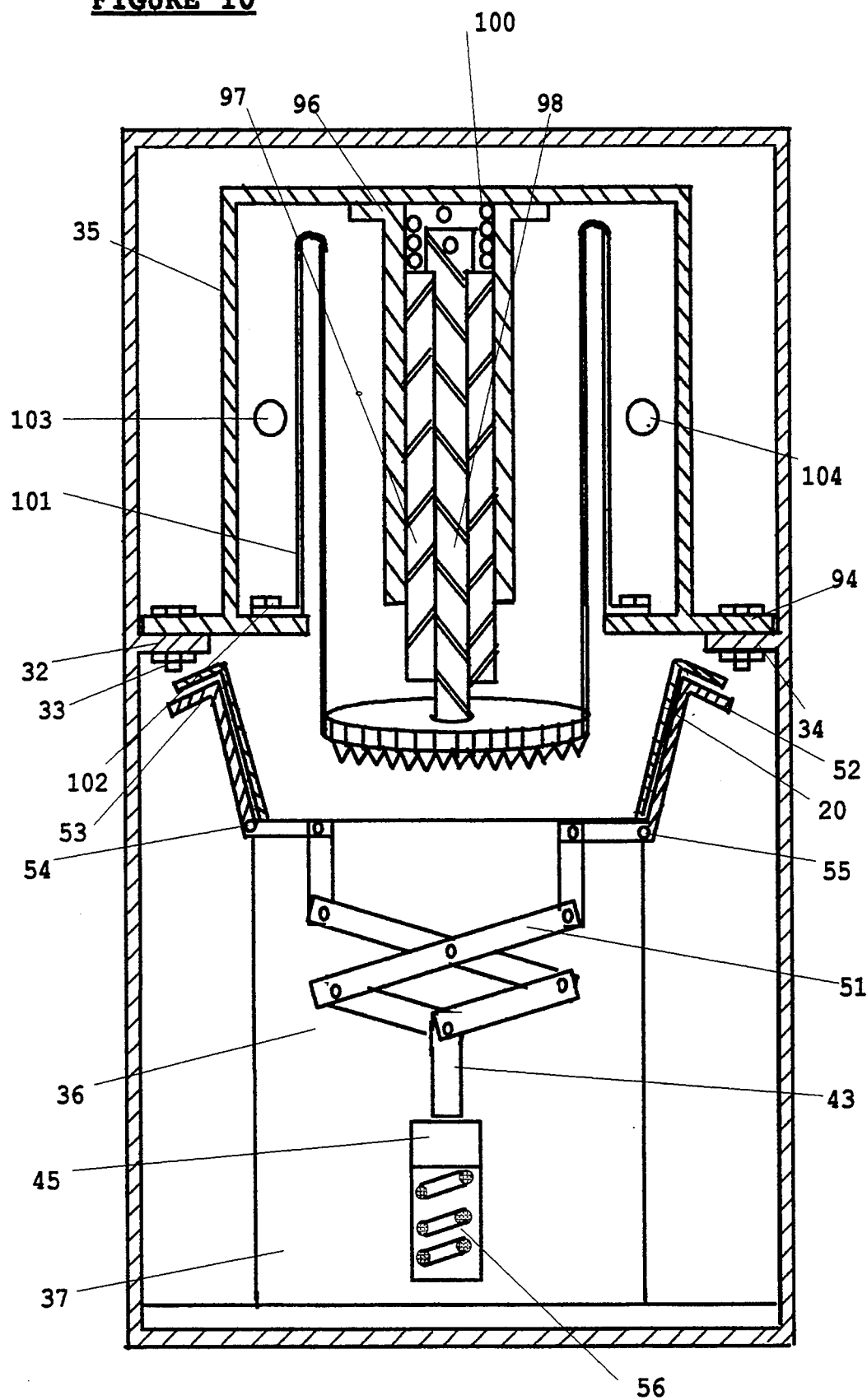
FIG. 10 is a sectional view through a typical recycling unit with the waste retainer sealing and locking actuator and mechanism in a non operating (not pressurized) position of the preferred embodiment.

A waste container assembly 36 comprises of a base 37 which is equipped with sliding means 38 so as to easily slide on rails 39 which are attached to the compartment 16, a bag holder 40 in which the waste collection bag 20 is fitted, and resilient shock mounts 41 which are provided between the base 37 and the bag holder for damping the shock resulted during the recycling operation shown in FIG. 9. A pneumatic linear actuator 42 is attached in the head side to the base 37, with the rod end 43 pivoted to a dual parallelogram mechanism 44. The dual parallelogram mechanism is pivoted to bottom doors 47 and 48, which are hinged to the base 37, and rotate to uncover the bottom opening 49 of the base 37 when the actuator 42 is operated, so as to allow the release of the filled waste bag downwards from the container assembly 36 when disposal of the waste bag is required. The waste bag is then pushed down through the bottom opening 49. A return spring 50 in the actuator will pull the bottom doors 47 and 48 so as to close the bottom opening, after the waste bag was disposed of through opening The parallelogram provides mechanical locking of the doors, so that the direct downwards force on the bottom doors 47 and 48 during the compacting of the waste material will not open the doors.

A mechanism 51 which is comprised of dual parallelograms construction is attached to each of two bag sealing flaps 52 and 53 in one end and to actuator 45 on the other end. The flaps are hinged to the bag holder by means of hinges 54 and 55. When the actuator 42 is energized, it pushes the mechanism 51 so as to turn the bag sealing flaps 52 and 53 towards each other till they bump each other, so as to seal the bag. When the actuator is de-energized, the return spring 56 will turn the hinges 54 and 55 so as to move the bag sealing flaps to the open bag position. A waste collection bag 20 made of recyclable materials and is constructed with strengthening means which prevent it from being torn apart due to the crushing and compacting forces acting during the recycling process. The bag is marked with bar-code sticker which includes information on the waste type, and on the identification of the household or commercial. Sealing means which are pressure sensitive are provided for the sealing of the bag after it is filled.

A special waste collection bag for washable waste materials such as glass, plastics and aluminum cans, made of water resistant material such as plastic and with fine perforated bottom to allow water drainage during washing operation.

A water spraying system, shown in FIG. 4, comprises spraying spouts 60 are attached to the circumference of the compartment 16. Water pipes system are connected to the spouts 60. An inlet water tube is hermetically welded through the wall of the compartment 16 and provide water to the water pipe system 61. A solenoid operated water valve 63 is connected to the household water system through inlet fitting and control the water supply to the inlet tube 62 and the water spraying system.

The sprayed water rinses and cleans the waste material such as plastics, glass, aluminum cans, etc, which is crushed or perforated inside the waste collecting bag for washable waste materials. The water then is drained through the bottom opening of the waste container assembly, to the bottom panel doors of the compartment 16. Then the water is drained through a draining system in the floor which is connected to the drain system of the household or commercial building.

Figure 2:
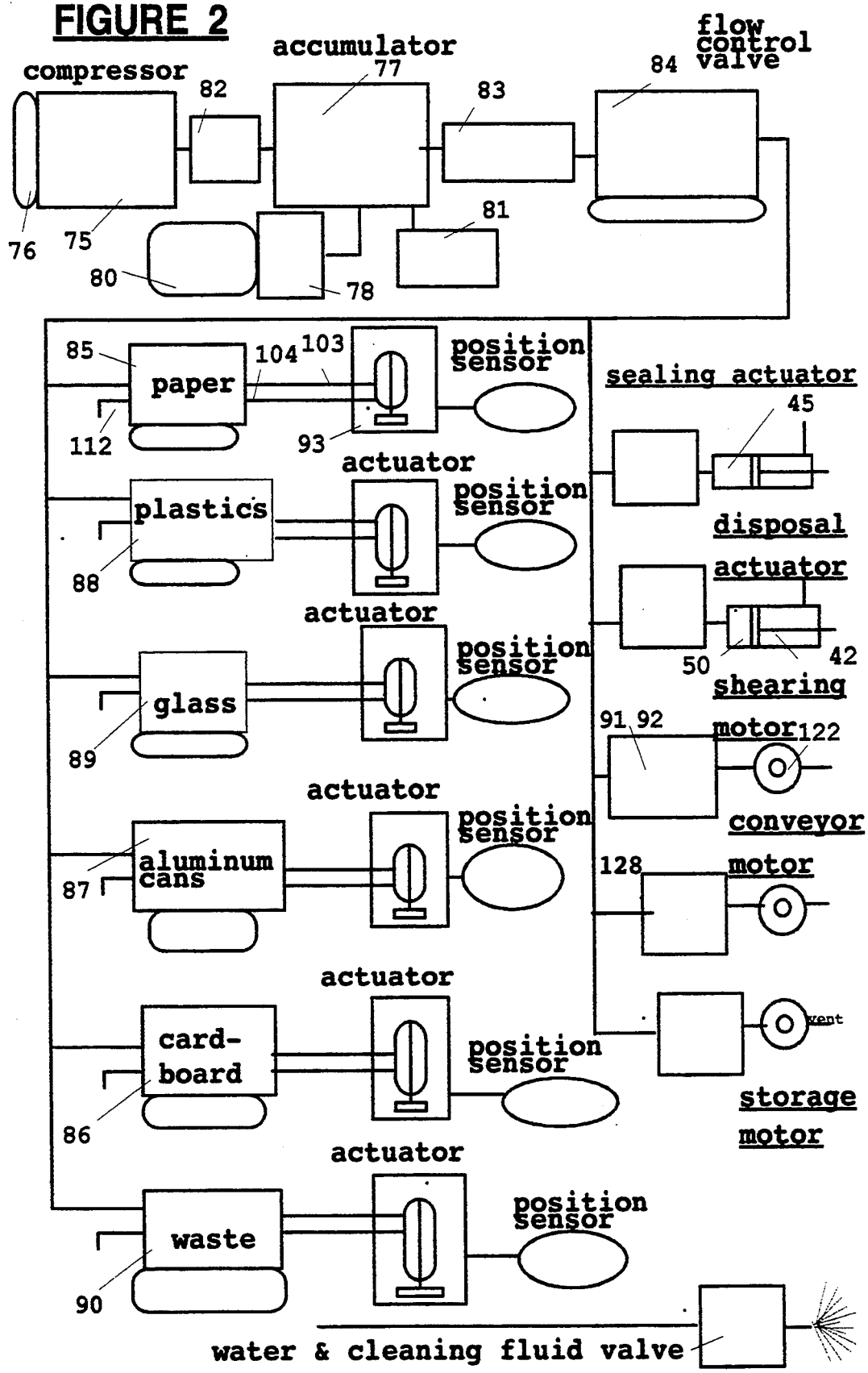
FIG. 2 is a schematic diagram of the fluid power actuation system of the automatic waste recycling machine and disposal system.

Referring to FIG. 2, a schematic diagram of the fluid power actuation system is presented. In this preferred embodiment, the system is pneumatic and uses compressed air to perform the recycling basic operations, the shearing of paper and cardboard paper, the automatic locking of filled waste packaging, the conveying of the waste bag packages, and the external storage means for the waste packages.

The advantage of pneumatic system over hydraulic system is the lower cost and the fact that the returned lines are vented to the atmosphere, instead of being routed back to the pump.

The pneumatic system comprises a compressor 75 which is driven by a electric motor 76. An accumulator 77 stores the compressed air energy, so that the electric motor 76 is operating only intermittently so as to keep the accumulator 77 pressurized to the required operating pressure. A pressure sensor 78 is attached to the accumulator for the measurement of the accumulator air pressure.

A pressure control system comprises pressure transducer 80 which is attached to the accumulator 77 and provides electrical output proportional to the its pressure. When the pressure in the accumulator decreases because of compressed air consumption by the system, the pressure transducer will provide the signal for turning the electric motor 76 on and when the required pressure is built, the pressure transducer 80 will provide a signal to turn the electric motor off.

A relief valve 81 prevents over-pressure in the accumulator and will relieve excess compressed air to the atmosphere. Two check valves 82 and 83 directs the air flow from the compressor 75 to the accumulator 77 and from the accumulator to the main flow control valve 84 respectively.

A flow control system comprises a main flow controlled solenoid actuated valve 84, which will allow the operation of the recycling machine units only if the pressure in the accumulator is as required.

A solenoid actuated three way, flow control valves 85, 86, 87, 88, 89 and 90 control the compressed air flow to the recycling units of newspaper, cardboard, aluminum can, plastic, glass and non-recyclable waste respectively.

A solenoid actuated flow control valves 91 and 92 control the compressed air flow to the air motor which actuate the shearing operation of paper and cardboard respectively.

FIG. 6 presents a sectional view of the typical actuation system for each recycling machine unit, which comprises: Rigid ram plate 93 which moves at high speed downwards so as to crush the waste The contact lower surface with the waste is hard and uneven for crushing glass, wavy for paper, hard with sharp surfaces for perforating plastics to prevent air lockup and hard and rough surface for crushing aluminum cans.

A pressure vessel container 35 equipped with a flange 94 on the open lower end for hermetically attachment to the compartment flange 32 with fasteners 33 and a sealing gasket 95 between the two flanges 94 and 32. A bushing 96 which is attached to the top side of the pressure vessel container 35, provides low friction housing means to telescopic shaft 97 comprises inner rod 98 which slides into the tube and perpendicularly attached to ram plate 93. extension type spring 100 is connected to pressure vessel container 35 and to the outer tube 97, so as to pull the ram plate 93 upwards when the compressed air supply is stopped.

Figure 3:
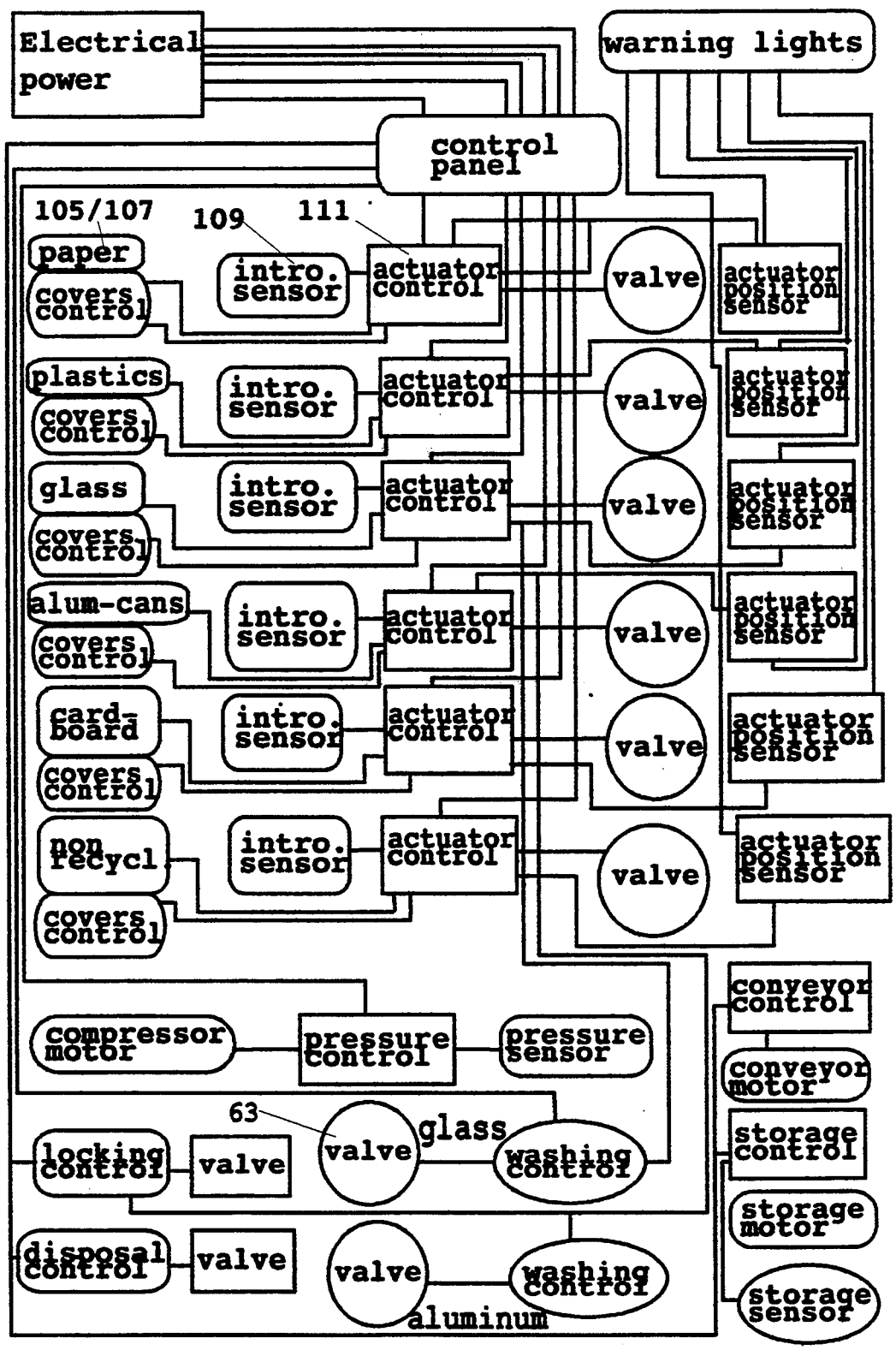
FIG. 3 is a schematic diagram of the electrical and safety system of the automatic waste recycling machine and disposal system.

A rolling type flexible diaphragm 101 with a flange 102 which is hermetically attached to flange 94 with fasteners 33. An inlet tube 103 through which compressed air enters the pressure vessel container 35 so as to pressurize the volume between the diaphragm 101 and the pressure vessel container 35, thus causing the rapid downwards motion of the ram plate 93. An outlet tube 104 which is attached to the pressure vessel container 35 through which the compressed air is evacuated to the vent port of the flow control valves and from there to the atmosphere. Referring to FIG. 3, a schematic diagram of the electrical control and safety system is presented. The preferred embodiment shown is typical to each recycling machine unit, and comprises: A magnetic position sensor 105 is attached to cover 18 and a magnet assembly 106 which is attached to the compartment front panel 5, so that when the cover is in the closed position, the magnetic sensor is activated by the magnetic field of the magnet and functions as a normally open (NO) switch which is turned to closed position, so that the actuation of the recycling machine is prevented when the cover 18 is open, as in the case of the introducing the waste material through the opening 17. The recycling operation will be done automatically after the cover 18 is closed, for safety.

A magnetic position sensor 107 is attached to cover 28 and a magnet assembly, 108 which is attached to the compartment front panel 5, so that when the cover is in the closed position, the magnetic sensor is activated by the magnetic field of the magnet and functions as a normally open (NO) switch which is turned to closed position, so that the actuation of the recycling machine is prevented when the cover 28 is open as in the case of loading an empty waste collection bag through opening 17. The recycling operation will be done automatically after cover 28 is closed, for safety.

A magnetic position sensor 109 attached to partition 23 and magnet assembly 110 which is attached to the compartment 16 guiding means 22, so that when the partition 23 is in the closed position, the magnetic field of the magnet activates the magnetic sensor 109.

The recycling operation will not take place unless the partition is in closed position, to make sure that the waste material is in the waste collection bag 20, and not in the guiding passage.

A control circuit 111 which will activates the recycling operation automatically whenever the partition 23 was opened for the introduction of waste material and closed thereafter. The ram plate 93 will therefore crush and compact the newly introduced waste material, and than the flow control valve will stop the compressed air flow and the compressed air will flow to the atmosphere through the outlet tube 104 and then through the vent port 112 of the three way solenoid actuated flow control valve. Actuation position sensor consists of magnetic position sensor 171 which is attached to waste container assembly 36 and permanent magnet assembly 172 which is attached to the ram 93 when the package means is filled with waste, the ram will stop at higher level from the bottom of the waste container. The sensor will be energized at the right level of the ram which corresponds to a filled package.

Figure 8:
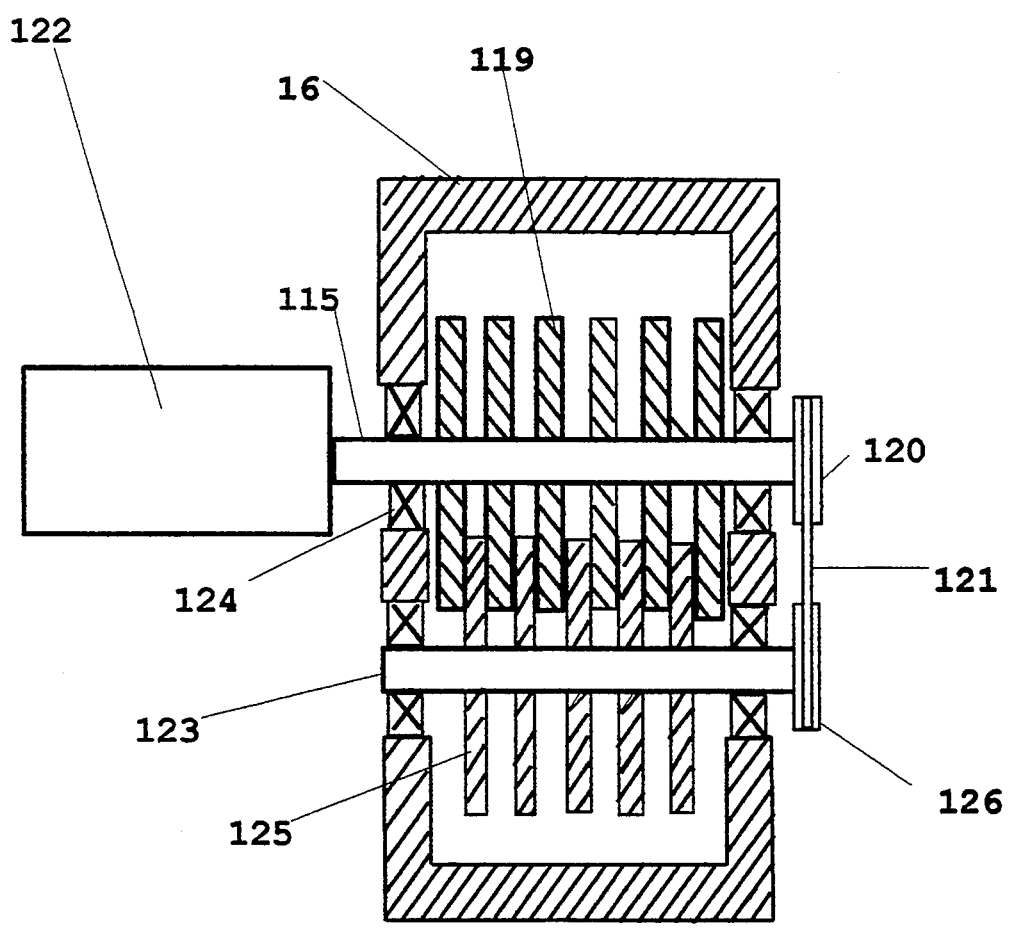
FIG. 8 shows the official paper and document shearing unit.

Referring to FIG. 8, a shearing unit for commercial paper which is mounted close to the inlet 17 of commercial or official paper recycling unit, in order to cut the paper to small pieces before being recycled. Shearing the waste paper is one of the options available for commercial paper and cardboard paper, and, is chosen by the operator by a selecting knob 3. The shearing unit comprises:

A shaft assembly comprises a rotating shaft 115 mounted on bearings and which are supported by the compartment 16. The shaft 115 is equipped with a longitudinal key groove into which multiple shear disks 119 are mounted and being driven by shaft 115. A sprocket 126 is keyed on the shaft which is driven by belt transmission 121 by means of air motor 122. A sprocket is keyed to shaft 115 and drives a parallel shaft 123 with a belt transmission 121 at same speed but at opposite direction. Shaft 123 is similar to shaft 115, with similar shear disks 125 which are each located between two shear disks 119, so as to produce a pulling force on a paper so as to pull it in between shear disks 125 and 119 so that the paper is sheared and thrown beyond the disks towards the waste collection bag.

Referring to 7, A cross section in the automatic conveying system which conveys the sealed waste bag from the automatic recycling machine. A belt 126 turning on rollers 127 which are driven by air motor 128, carries the bag towards from the automatic recycling machine towards a tunnel. Guiding means directs the waste bag towards the tunnel 129. The tunnel includes a conveying belt 126, which carry the bag through the tunnel 129. The tunnel is located below and across the floor in the household or commercial building. A partition 132 with a circumference seal is mounted on hinge 133 with torsion spring 134. The partition 132, seals and isolate the tunnel from the external environment. An electrically remote controlled latching means 135 are used for latching the partition. The waste bag pushes the unlatched partition on its way out of the household building. The tunnel 129 with the conveying belt are extended in a sealed construction below ground level till it reaches a waste storage bin 136 which is sealed all over and equipped with a top cover 137. The conveying belt is pushing the waste bag into a circular bag storage housing 138 with sectors 139. the housing is mounted on two bearings, and is turning automatically within an accurate angular displacement so as to bring the empty storage sector 193 to be in front of the tunnel 129 end, ready to store the following waste bag which is disposed from the household recycling machine.

An light indication means 141 is attached to the bin and indicate what types of waste material bag 20 is stored in the waste storage bin 136, so that the public collection truck will remove the waste bags according to their waste type.

We claim:

1. An automatic recycling machine and disposal system for compacting, crushing, packaging in waste packaging means, sealing said waste packaging means and disposal of said waste packaging means, comprises:
    (a) a sealed housing means, comprises:
        (a1) opening means in said housing for receiving sorted waste material, and for disposal of said waste packaging means,
        (a2) sealed covering means for said opening means,
    (b) actuation means, operating by compressed gas, inside said housing means, comprises:
        (b1) fixed member with pressure boundary means, attached to said housing means,
        (b2) moving member with pressure boundary means, which moves relative to said fixed member by force applied by said compressed gas, in direction in which said moving member becomes further away from said fixed member,
        (b3) sealing means for sealing between said pressure boundaries of fixed and moving members for creating one sealed pressure boundary between said fixed and moving members,
        (b4) inlet port means for pressurized gas, to enter said sealed pressure boundary between said fixed and said moving members,
        (b5) outlet port means for pressurized gas, to exit said pressure boundary means between said fixed and said moving members,
        (b6) flow control means for pressurized gas to control flow through said inlet port means to said pressure boundary between said fixed and said moving members, (b7) flow control means for pressurized gas to control flow through said outlet port means from said pressure boundary between said fixed and said moving members, (b8) ramming plate means moving with said moving member and impacting waste material in said waste packaging means for waste compacting, crushing and perforating, (b9) extension type spring which is connected between said moving member and said housing, and applies restoring force on said moving member, so as to moves it closer to said fixed member, when compressed gas pressure is reduced through said outlet port means, (c) pressurized gas source connected to said flow control means (d) waste packaging means which receives sorted waste material through said opening in said housing, (e) an electrical control means to control said flow control means so as to control the operation of said actuation means, waste packaging means, (f) position sensing means for said ramming plate location, and for providing signal to said control means when said waste packaging means is filled, (g) a waste containing means to support said waste packaging means during the impact loads applied by said ramming plate means.

2. The automatic recycling machine of claim 1 wherein said moving member means further comprises:

(a.) a ramming plate means for applying crushing forces on the various types of waste material within said waste packaging means, whereby the shape of the ramming plate means for perforating plastic material include sharp long teeth which penetrates the plastic material during impact and prevents air entrapment inside the plastic container, (b.) a telescopic guiding means for directing the motion of said ramming plate and said moving member means toward the processed waste material and back to its former position.

3. The automatic recycling machine of claim 1 wherein said machine housing means further includes shearing means for official paper and documents, comprises:

(a) a motor operated by compressed gas, (b) a shaft supported by bearings means in both sides and coupled to said motor so as to be driven by said motor, (b) a parallel shaft supported by bearings parallel to said shaft and driven at same rotary speed and at opposite rotation direction to said shaft by rotary transmission means from said shaft, (c) shearing disks rigidly attached to said shaft and rotating with said shaft in one direction, and shearing disks rigidly attached to said parallel shaft and rotating with said parallel shaft in opposite rotation direction, so that the each disk mounting and rotating with said shaft is located between two disks mounting and rotating with said parallel shaft, and the axial clearance between each adjacent said disks is controlled to a minimum so as to create shearing effect on paper which is inserted between said rotating disks, (d) flow control means to control compressed air flow to said motor, (e) control means to control the operation of said flow control means.

4. The automatic recycling machine of claim 1 wherein said control means further including warning means, comprises indication means which are turned on whenever the waste packaging means is filled up, whereby the operator is warned about the need to put new waste collection unit means to replace the filled up waste collection unit after it is removed.

5. The automatic recycling machine of claim 1, wherein said waste containing means further including means to automatically dispose of said waste packaging means, after it is filled up with waste material, comprises:

(a.) an opening in the bottom side of said waste containing means, (b.) a covering means made of hinged members for keeping said opening closed, and for opening it when said waste packaging means is filled with waste material, whereby disposal of said waste packaging means from said containing means can be done, (c.) an actuation mechanism means for opening said covering means, comprises:

(c.1) an actuation means for moving said covering means from closed position to open position and from open position to closed position of said opening, which includes a moving member, which moves when pressurized gas is applied to said actuation means, (c.2) a pressurized fluid for applying substantial forces, (c.3) a flow control means to control the flow of pressurized fluid to said actuation means, (c.4) a double parallelogram mechanism means connected to said actuation means moving member and to said covering means, (c.5) a flow control means for controlling the flow of pressurizes fluid to said actuation means, (c.6) control means to control the operation of said flow control means, whereby said opening is opened when said actuation means are pressurized by said flow control means, (d.) said ramming plate means for pushing the waste packaging means through said opening in said waste retaining means after being opened by said actuation means, and for further pushing it through the bottom opening of said housing means.

6. The automatic recycling machine of claim 1 wherein said control means further comprises: sensing means for providing signal means to said control means, whenever either one of said openings in said housing is not substantially covered by said covering means, whereby the open or closed position of said covering means is sensed for safety, so that no actuation will occur when either one of said covering means is open, comprises:

(a) a permanent magnet attached to the said covering means, (b) a magnetic field sensor attached to the said housing, so that when said covering means is in closed position, said permanent magnet is in close proximity to the magnetic field sensor, and the sensor provide signal to said control means.

7. The automatic recycling machine of claim 1 wherein said control means further comprises:

(a1) partition means located between said opening means where new sorted waste material is received and between said waste packaging means, whereby said partition must be tilted to allow receiving of the waste material, (a2) sensing means for providing signal means to said control means whenever waste material is introduced into said housing, whereby said control means receives the signal from the sensing means and then operates said actuation means for the compacting process of the new introduced waste material, comprises:

(b1) permanent magnet attached to said partition means, (b2) magnetic field sensor attached to the said housing, so that when said partition means is in closed position, said permanent magnet is in close proximity to the magnetic field sensor, and the sensor provide signal to said control means.

8. The automatic recycling machine of claim 1 wherein said control means further comprises:

sensing means for providing signal means to said control means whenever the waste collection unit means are filled with waste material, whereby the control means receives the signal from the sensing means and then operates said sealing means for said waste packaging means, and also provides a signal to said panel warning means indicating the filled packaging means, comprises:

(a1) permanent magnet attached to said ramming plate means, (a2) magnetic field sensor attached to the said housing, so that when said waste packaging means is filled, the ramming plate position will be such that said permanent magnet is in close proximity to the magnetic field sensor, and the sensor provide signal to said control means.

9. The automatic recycling machine of claim 1, wherein said waste containing means further comprises an automatic machine for closing and sealing a waste packaging means after said packaging means is filled with waste material, whereby preparing said packaging means for disposal, wherein said waste containing means comprising:

(a.) a waste packaging means which is installed inside said waste containing means, comprises:

(a.1) containing means for waste material, (a.2) an opening in said containing means for introducing waste material, (a.3) pressure sensitive locking means which are attached to the circumference of said containing means around said opening, whereby closing of said waste packaging means can be done when force is applied to said pressure sensitive sealing means, (a.4) identification of waste type means for said waste packaging means including identification of waste type and other information as required, for waste collection means for sorting the waste type, and additional information might be added for providing credit to household or commercial which is the waste source, (b.) actuation means, comprising;

(b.1) a pressurized fluid, whereby substantial force can be applied, (b.2) a pressure boundary means to house said pressurized fluid, (b.3) a moving member of said pressure boundary which moves when fluid pressure is applied inside the pressure boundary, (b.4) a pushing means for moving said moving member in the direction opposite to its movement when under fluid pressure, whereby bringing it back to its initial position before pressure is applied, (c.) a flow control means to control the flow of said pressurized fluid to said actuation means, (d.) mechanism means connected to said moving member of said actuation means, (e.) hinged members which are driven by said mechanism means for applying the closing forces to said pressure sensitive locking means of said waste packaging means, (f.) control means to control the operation of said actuation means.

10. The automatic recycling machine of claim 1, wherein said machine housing means further including an automatic rinsing machine for removing contamination and dirt from household and commercial waste material by spraying it with a cleaning liquid and then draining and removal of said cleaning liquid from the waste material, comprising:

(a.) said waste packaging means installed in said waste container further includes perforated bottom for draining liquids, (b.) a source of pressurized cleaning liquid, (c.) spraying means for said cleaning liquid for rinsing and washing waste material located in said waste packaging means, (e.) flow control means for controlling the cleaning liquid flow through said spraying means, (f) control means for operation of said flow control means, (g) draining means for said cleaning liquid after the cleaning operation, whereby the cleaning liquid will be removed from said waste packaging means and outside the automatic waste recycling machine through the bottom opening of said machine housing.

11. The automatic recycling machine of claim 1, wherein said waste packaging means is automatically removed from said machine housing means to automatic conveying machine for waste packaging means, comprises:

(a.) conveyor housing means for providing housing and structural means to said conveying machine, whereby said conveyor housing can be mounted below the floor level of household or commercial building and then extending outside said building to a waste storage location, (b.) rolling members means, which are pivoted to said conveyor housing means, (c.) driving members means, which are pivoted to said conveyor housing means, (d.) conveying means for said waste packaging means which moves over said rollers and are being moved by said driving members inside said conveyor housing means, whereby said waste packaging means are carried by said conveying means from internal building location to external storage location, (e.) driving means for said driving members for moving said conveying means, whereby providing the power required for conveying said waste packaging means, (f.) control means to control the operation of said driving means which is integrated with said control means of the automatic recycling machine, whereby said conveyor means are operated after said packaging means is removed from said machine housing means, and are turned off when said waste packaging means reaches its destination, (g.) isolation partition means for isolating the conveyor housing means which are located inside the household or commercial building from the conveyor housing means which are located externally from said building, comprises:

(g.1) partition means for isolating said conveyor housing means, which is hinged to said conveyor housing means, (g.2) latching means of said partition to said conveyor housing means, for locking said partition to said conveyor housing means, whereby isolating it from outside the household or commercial building, (g.3) torsion spring means which turns said partition to closed position, whereby said partition is being opened by the pushing action of said waste packaging means, and then closed by the torsion spring, (g.4) control means to open said latching means before said waste packaging means is being conveyed by said conveyor means, whereby said packaging means can push said partition and pass beyond said partition.

12. The automatic recycling machine of claim 11, wherein said waste packaging means are further conveyed and stored within automatic storage machine for waste packaging means, comprises:

(a.) storage housing means for storage of waste packaging means in sealed volume, whereby waste packaging means are stored as separate units, (b.) an inlet opening, whereby said waste packaging means can be introduced to said storage housing means, (c.) an outlet opening in said storage housing means for removal of waste packaging means from the containing means, (d.) a covering means for said outlet opening means, in said storage housing means, (e.) storage units assembly means including plural storage units for said waste packaging means, (f.) a turning member means which is mounted to said storage units assembly means and supported by supporting means in said storage housing means for providing angular motion of said storage units assembly relative to said storage housing, (g) driving means for said turning member means, whereby said turning member means is driven to the required angular position in which an non-occupied storage unit of said storage units assembly means is located in front of the said inlet opening for receiving new waste packaging means for storage, (h) sensing means for detecting angular position of said storage units assembly means relative to said inlet opening in said storage housing means, whereby providing signal for the driving means for the required angular positioning, (i) said conveying machine means for conveying and loading said waste packaging means from said conveying machine into non-occupied storage unit of said storage units assembly, (j) controls means for said driving means, which are integrated as part of said control means of the automatic recycling machine, whereby a waste packaging means is loaded automatically to non-occupied storage unit in said storage unit means, and then said storage units assembly means is turned relative to said storage housing means, so that additional waste packaging means will be stored in non-occupied storage space in said storage units assembly means.

13. The automatic recycling machine of claim 12, wherein said automatic storage machine for plural waste packaging means further comprises:

(a.) indication means including plural indication means for said plural storage units which are attached to said storage housing means and indicate what waste type is being stored in said storage units and which storage unit is non-occupied, (b.) control means integrated with said control means of the automatic recycling machine, which control said indication means.

* * * * *